(12) United States Patent
Sumner

(10) Patent No.: US 9,050,674 B2
(45) Date of Patent: Jun. 9, 2015

(54) METHOD AND SYSTEM OF EDGING CLADDING OPERATION

(71) Applicant: LINCOLN GLOBAL, INC., City of Industry, CA (US)

(72) Inventor: Steven R. Sumner, Brunswick, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 312 days.

(21) Appl. No.: 13/790,701

(22) Filed: Mar. 8, 2013

(65) Prior Publication Data

US 2014/0034615 A1 Feb. 6, 2014

Related U.S. Application Data

(60) Provisional application No. 61/679,465, filed on Aug. 3, 2012.

(51) Int. Cl.

| | |
|---|---|
| *B23K 9/04* | (2006.01) |
| *B23K 26/34* | (2014.01) |
| *B23K 9/10* | (2006.01) |
| *B23K 10/02* | (2006.01) |
| *B23K 15/00* | (2006.01) |
| *B23K 26/00* | (2014.01) |
| *B23K 26/06* | (2014.01) |
| *B23K 26/14* | (2014.01) |

(52) U.S. Cl.
CPC . *B23K 9/042* (2013.01); *B23K 9/04* (2013.01); *B23K 26/1429* (2013.01); *B23K 9/1093* (2013.01); *B23K 10/027* (2013.01); *B23K 15/0086* (2013.01); *B23K 26/0075* (2013.01); *B23K 26/0078* (2013.01); *B23K 26/0081* (2013.01); *B23K 26/0604* (2013.01); *B23K 26/345* (2013.01); *B23K 26/34* (2013.01)

(58) Field of Classification Search
CPC ........ B23K 9/04; B23K 26/34; B23K 26/345; B23K 26/1429
USPC ............................ 219/76.1–77, 121.63–121.7
See application file for complete search history.

(56) References Cited

U.S. PATENT DOCUMENTS

| 4,611,111 A | * | 9/1986 | Baheti et al. | ............. 219/124.34 |
| 5,308,409 A | * | 5/1994 | Kamimura et al. | ........... 148/512 |
| 2012/0006795 A1 | * | 1/2012 | Nowak et al. | ............ 219/121.64 |

* cited by examiner

*Primary Examiner* — Samuel M Heinrich
(74) *Attorney, Agent, or Firm* — Perkins Coie LLP

(57) ABSTRACT

A system and method for edging a deposit layer in any of cladding, building up, and hard-facing applications is provided. The system includes a high intensity heat source that heats a workpiece and creates a molten puddle. The system also includes a wire feeder that feeds a wire to the molten puddle. The wire melts in the molten puddle and creates a bond with the molten puddle to form the deposit layer on the workpiece. The system further includes an edging system that has at least one laser that emits a laser beam that impinges on at least one of a surface area and an edge area of the deposit layer to modify the deposit layer. The laser modifies the deposit layer by at least one of melting and vaporizing at least a portion of the surface area and/or the edge area.

20 Claims, 5 Drawing Sheets

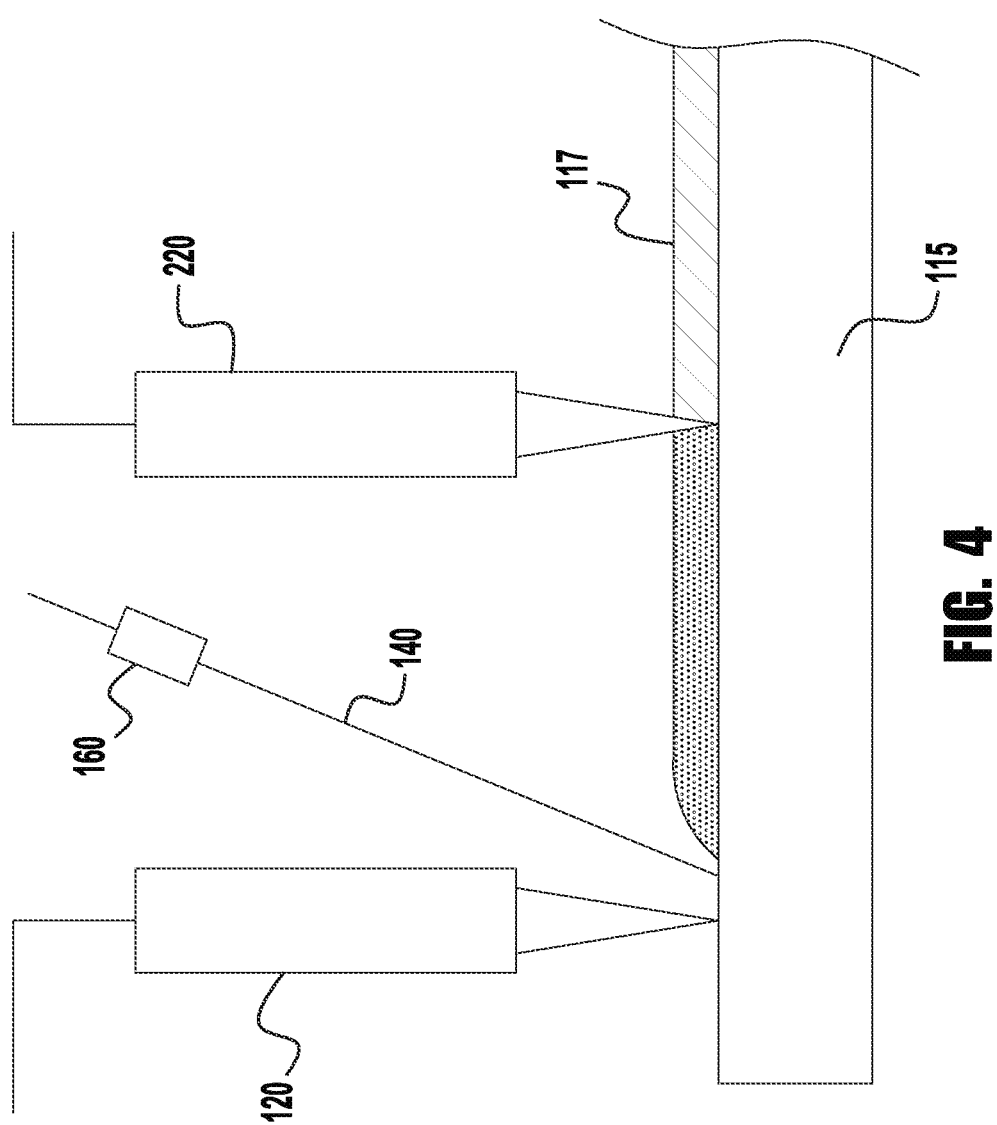

METHOD AND SYSTEM OF EDGING CLADDING OPERATION

PRIORITY

The present application claims priority to U.S. Provisional Patent Application No. 61/679,465, which is incorporated herein by reference in its entirety.

TECHNICAL FIELD

Certain embodiments relate to edging in systems and methods for cladding, building up, and hard-facing overlaying applications. More particularly, certain embodiments relate to a system and method for changing/modify the edge profile of overlaid materials in any of cladding, building up, and hard-facing overlaying applications.

BACKGROUND

The traditional method of cladding uses powder or a wire to provide a layer of cladding material over a substrate. The cladding layer may provide protections to the substrate, i.e., workpiece, such as, for example, corrosion and wear resistance. One traditional method of cladding a workpiece uses a gas-tungsten arc welding (GTAW) method to add the cladding layer. The tungsten electrode is used to create an arc and melt some of the workpiece creating a melt puddle as cladding material in the form of, e.g., a wire, is introduced to the puddle. The wire may be resistance-heated using a separate power supply. The wire is fed through a contact tube toward a workpiece and extends beyond the tube. The cladding material is melted and it and the workpiece form a metallurgical bond at the interface. Because there will be some dilution of the workpiece material into the cladding material, additional layers of cladding material may need to be applied before a "pure" cladding layer is formed and optimum protection is achieved, e.g., corrosion and/or wear-resistance.

As stated above, the wire and a portion of the workpiece are melted to form the metallurgical bond. As, in many applications, there is no mechanism to confine the melt puddle to a fixed area or boundary, the edges of the cladding layer will tend to flow over the workpiece and, once cooled, the edge may be rough and/or irregular. Although laser cladding provides greater control of the melt puddle, it still may be difficult to get the desired edge profile on the cladding layer using traditional cladding methods.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and method for changing/modify an edge profile of overlaid materials in any of cladding, building up, and hard-facing overlaying applications. The system includes a high intensity heat source that heats a workpiece and creates a molten puddle. The system also includes a wire feeder that feeds a wire to the molten puddle. The wire melts in the molten puddle and creates a bond with the molten puddle to form a deposit layer on the workpiece. The system further includes an edging system that has at least one laser that emits a laser beam that impinges on at least one of a surface area and an edge area of the deposit layer to modify the deposit layer. The laser modifies the deposit layer by at least one of melting and vaporizing at least a portion of the surface area and/or the edge area.

The method includes heating a workpiece to create a molten puddle and feeding a wire to the molten puddle. The wire melts in the molten puddle and creates a bond with the molten puddle to form the deposit layer on the workpiece. The method also includes impinging at least one laser beam on at least one of a surface area and an edge area of the deposit layer to modify the deposit layer. The laser beam modifies the deposit layer by at least one of melting and vaporizing at least a portion of the surface area and/or the edge area.

The method also includes applying energy from a high intensity energy source to the workpiece to heat the workpiece at least while applying the flow of heating current. The high intensity energy source may include at least one of a laser device, a plasma arc welding (PAW) device, a gas tungsten arc welding (GTAW) device, a gas metal arc welding (GMAW) device, a flux cored arc welding (FCAW) device, and a submerged arc welding (SAW) device.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIG. 4 illustrates an exemplary embodiment of an edging system that can be used with the system of FIG. 1;

DETAILED DESCRIPTION

Figure 1:
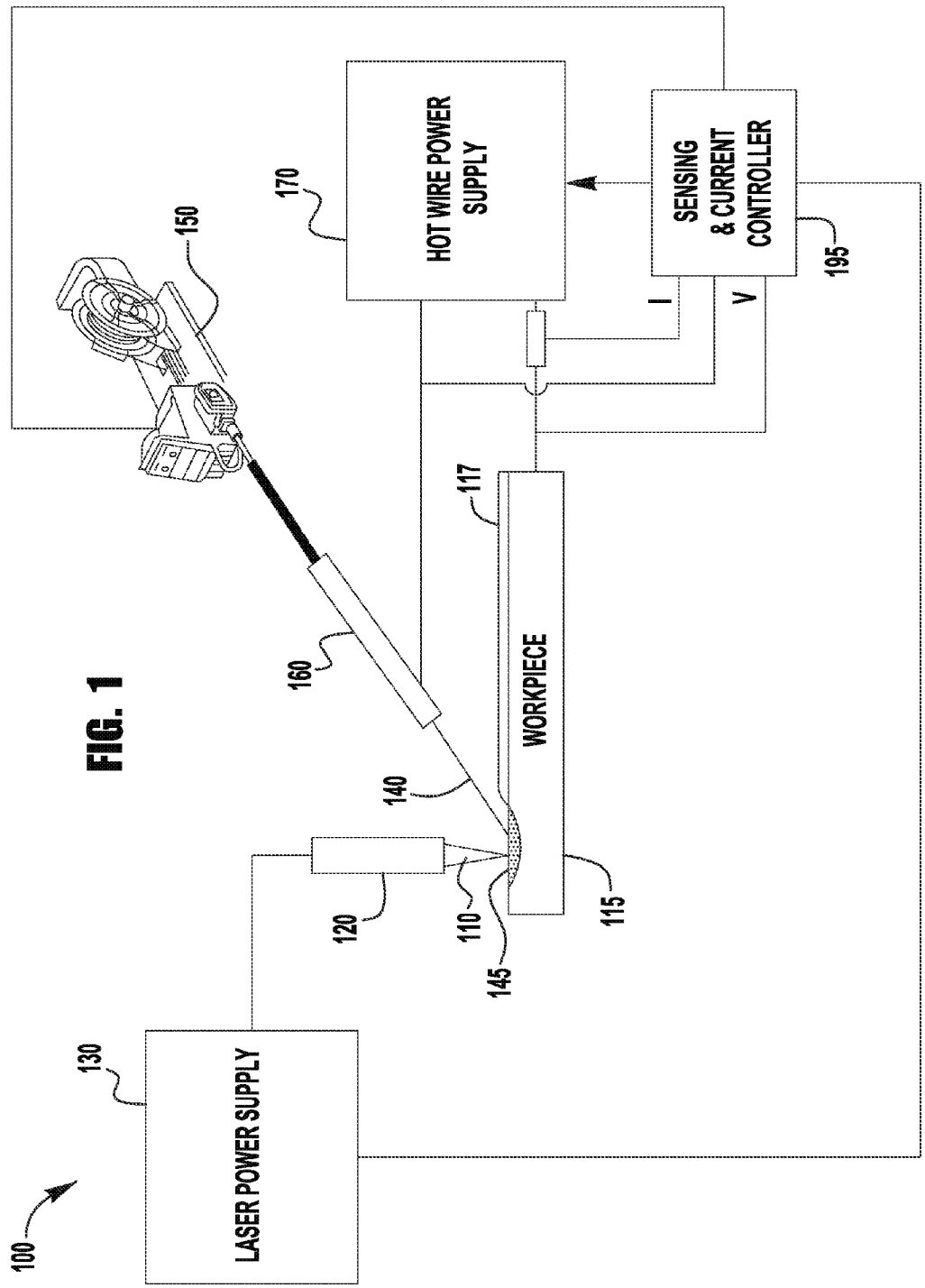
FIG. 1 illustrates a functional schematic block diagram of an exemplary embodiment of a combination wire feeder and energy source system for any of cladding, building up, and hard-facing overlaying applications.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 illustrates a functional schematic block diagram of an exemplary embodiment of a combination wire feeder and energy source system 100 for performing any of cladding, building up, and hard-facing overlaying applications. The system 100 includes a laser subsystem 130/120 capable of focusing a laser beam 110 onto a workpiece 115 to heat the workpiece 115 and create a melt puddle 145. The laser subsystem is a high intensity energy source. The laser subsystem can be any type of high energy laser source, including but not limited to carbon dioxide, Nd:YAG, Yb-disk, YB-fiber, fiber delivered or direct diode laser systems. Further, even white light or quartz laser type systems can be used if they have sufficient energy. Other embodiments of the system may include at least one of an electron beam, a plasma arc welding subsystem, a gas tungsten arc welding subsystem, a gas metal arc welding subsystem, a flux cored arc welding subsystem, and a submerged arc welding subsystem serving as the high intensity energy source.

The following description will repeatedly refer to the laser system, beam and power supply, however, it should be understood that this reference is exemplary as any high intensity energy source may be used. For example, a high intensity energy source can provide at least 500 W/cm$^2$. However, more importantly, the high intensity energy sources, such as the laser devices 120 discussed herein, should be of a type having sufficient power to provide the necessary energy density for the desired cladding, building-up, and/or overlaying operation. That is, the laser device 120 should have a power sufficient to create and maintain a stable melt puddle throughout the cladding/building-up/overlaying process. Exemplary lasers should have power capabilities in the range of 1 to 20 kW, and may have a power capability in the range of 5 to 20 kW. Higher power lasers can be utilized, but can become very costly.

As illustrated in FIG. 1, the laser subsystem 130/120 includes a laser device 120 and a laser power supply 130 operatively connected to each other. The laser power supply 130 provides power to operate the laser device 120. Laser device 120 allows for precise control of the size and depth of the melt puddle 145 as the laser beam 110 can be focused/defocused easily or have its beam intensity changed very easily. In general, the melt puddle 145 should only be deep enough to provide a proper metallurgical bond between the cladding material (i.e., wire 140) and the base workpiece 115. Depending on the materials, a proper metallurgical bond can be in the order of a few microns. By precisely controlling the laser 120, the laser beam 110 can create a wide, shallow melt puddle for faster cladding operations as well as minimizing the size of the heat affected zone on the workpiece 115.

The system 100 also includes a wire feeder subsystem capable of providing at least one resistive wire 140 (cladding material) to make contact with the workpiece 115 in the vicinity of the laser beam 110. Of course, it is understood that by reference to the workpiece 115 herein, the melt puddle 145, is considered part of the workpiece 115, thus reference to contact with the workpiece 115 includes contact with the puddle 145. The wire feeder subsystem includes a wire feeder 150, a contact tube 160, and a wire power supply 170. During operation, the wire 140 is resistance-heated by electrical current from the power supply 170 which is operatively connected between the contact tube 160 and the workpiece 115. In accordance with an embodiment of the present invention, the power supply 170 is a direct current (DC) power supply, which can provide DC pulses, although alternating current (AC) or other types of power supplies are possible as well.

The power supply 170, wire feeder 150, and laser power supply 130 may be operatively connected to sensing and control unit 195. The control unit 195 can control the welding operations. For example, the control unit 195 may control the wire feed speed via the wire feeder 150 in order to control the deposition rate of the cladding material. In some embodiments, the control unit 195 may control the wire temperature via the power supply 170 such that the wire 140 melts and forms a bond with the melted portion of workpiece 115, but then quickly cools to limit the amount of dilution at the bond interface. Further, in some embodiments, the control unit 195 may also control the weld puddle temperature via laser power supply 130. The control unit 195 can receive inputs such as the power used by power supplies 130 and 170, the voltage at contact tube 160, the heating current through the cladding wire, the desired and actual temperatures for the wire, the temperature of the melt puddle, etc. Application Ser. No. 13/212,025, titled "Method And System To Start And Use Combination Filler Wire Feed And High Intensity Energy Source For Welding," filed Aug. 17, 2011, and incorporated by reference in its entirety, discloses exemplary sensing and control units, including exemplary monitoring and control algorithms, that may be incorporated in the present invention. Accordingly, for brevity, the operation of the control and sensing unit 195 will not be further discussed.

Figure 2:
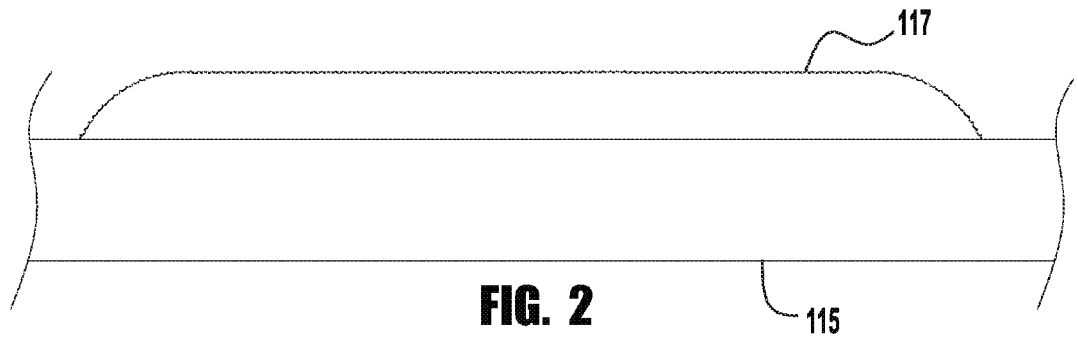
FIG. 2 illustrates a cross-sectional view of a cladding layer in the width direction.

During operation, the wire 140 is preheated by power supply 170 to at or near its melting point. Once the wire 140 contacts the melt puddle 145, the wire 140 melts and mixes with the melted workpiece 115 material. Because the depth of the melt puddle 145 is kept to the minimum needed to form a metallurgical bond, only a small portion of the wire 140 will mix with the weld puddle 145. Once melted and cooled, the wire 140 forms a cladding layer 117 on top of the workpiece 115. By limiting the bond interface, the surface of the cladding layer 117 is essentially pure cladding material and will provide the desired protection, e.g., corrosion resistance, wear resistance, etc. FIG. 2 illustrate cross-sectional view of the width of cladding layer 117 on top of the workpiece 115. As illustrated in FIG. 2, the edge the cladding layer 117 can be rough and irregular because the melted wire 140 will flow due to gravity, or because of the operation used to deposit the layer. In addition, the top of the cladding layer 117 may be irregular due to uneven cooling as the cladding layer 117 is deposited. These irregularities can become even more pronounced if an arc-type high intensity energy source is used to deposit the cladding material.

Figure 3:
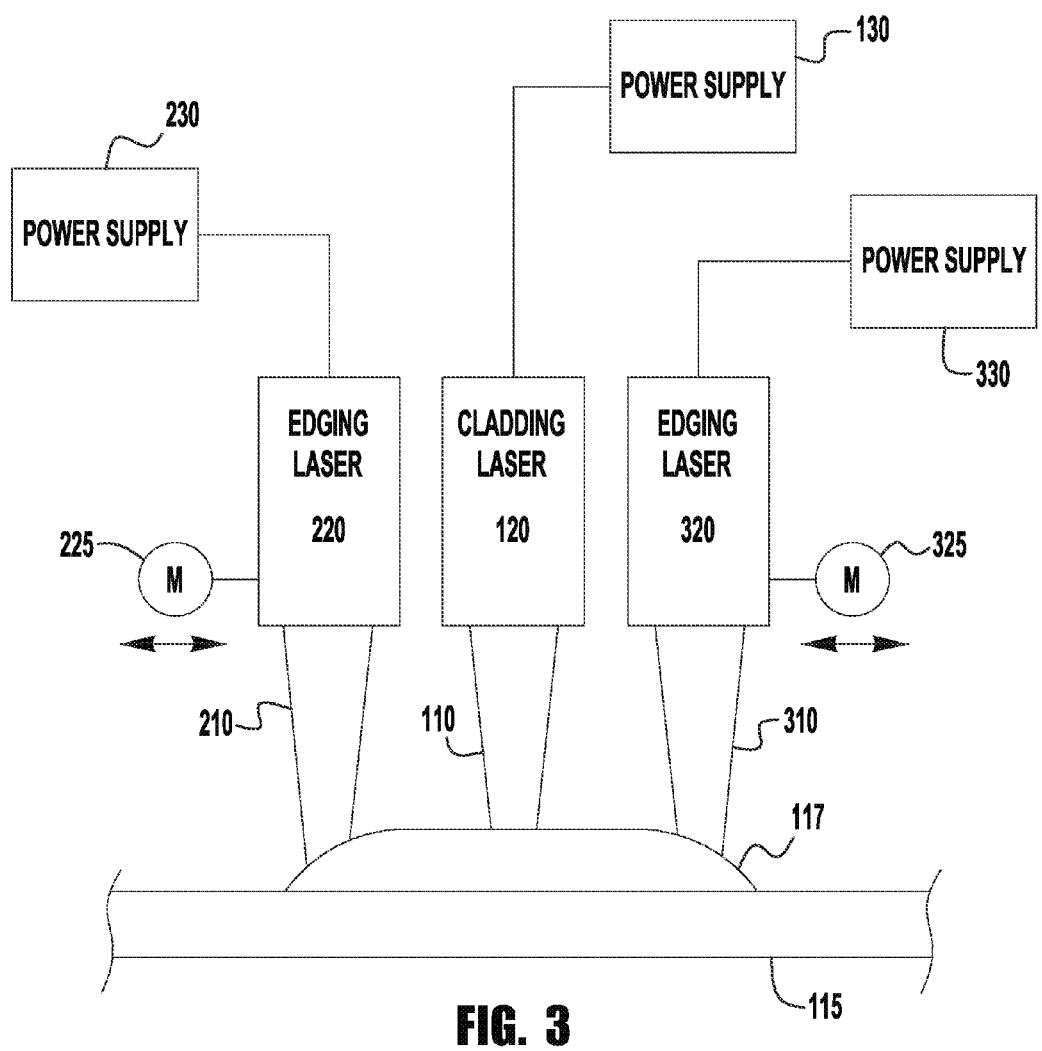
FIG. 3 illustrates a functional schematic block diagram of an exemplary embodiment of an edging system that can be used with the system of FIG. 1.

In some exemplary embodiments of the present invention, as illustrated in FIG. 3, the cladding system of FIG. 1 will include an edging system such as laser 220 and/or 320 to change/modify the edge of the cladding layer 117. The lasers 220/320 are powered by power supplies 230/330, respectively, and emit beams 210/310 to each side of the cladding layer 117. The lasers 220/320 can melt and/or vaporize the edge of cladding 117 to a desired profile. The lasers 220/230 can be moved by motors 225/325, respectively, in the width direction of the cladding layer 117 as show by the arrows under the motors. The motors 225/325 position lasers 220/320 such that the beams 210/310 impinge on the portion of the respective edge that needs to be melted/vaporized. In some embodiments, the motors 225/325 can position the lasers 220/320 such that the beams 210/310 can cover the entire surface of cladding layer 117, as well as the edges, if needed. For example, if the cladding surface needs to be smoothened or reshaped, each laser beam 210/310 can cover 50% to 100% of the cladding layer surface, including the edges, to melt or vaporize the surface as needed. In some embodiments, instead of (or in addition to) motors 225/325, appropriate optics (not shown) may be used to position the laser beams 210,310 to cover the edges and/or surface of the cladding layer 117. In other embodiments, a single laser (either 220 or 320) with 100% coverage of the cladding layer surface and edges can be used. For example, a single laser beam may be more economical in cases where simultaneous edging of the cladding layer 117 is not necessary.

In some embodiments, the lasers 220/320 are operated such that the lasers beams 210/310 modify the profile of the edge as the cladding layer 117 is being deposited by the system 100. That is, the deposition of the cladding layer 117 and the treatment of the cladding surface and/or edges are done in a single pass. Of course, the lasers 220/230 sufficiently trail the cladding operation such that there is enough time for the deposited cladding layer 117 to at least partially solidify before the laser beams 210/310 perform the edging (see FIG. 4, which shows laser 220 trailing laser 120). In some embodiments, cooling air may be used to quickly cool the cladding layer 117 after deposition. In other embodiments, the laser beams 210/310 are scanned over the cladding edge and/or surface only after the cladding layer 117 has been deposited. That is, the edging and/or surface treatment of cladding layer 117 is done separately from the cladding deposition pass.

In exemplary embodiments of the present invention, the power and/or focal points of laser beams 210/310 can be adjusted such that only a thin layer of the cladding is melted/vaporized. Such "fine" control of the laser beams 210/310 permits the edge profile to be changed without affecting the workpiece 115 or the main portion of the cladding layer 117. Of course, the power and/or focal points of laser beams 210/310 can also be adjusted to melt/vaporize large portions of the cladding edge when desired. Alternatively, or in addition to controlling the focal point, the laser beams 210/310 can be pulsed such that a predetermined amount of energy is transferred to the cladding edge/surface during each pulse. Each laser pulse will then melt/evaporate a predetermined amount of cladding material. Of course, any combination of laser beam intensity, frequency of laser pulses, speed of motors 225/325 (or optics), wire feed speed can be used to create the desired cladding profile.

Figure 5A:
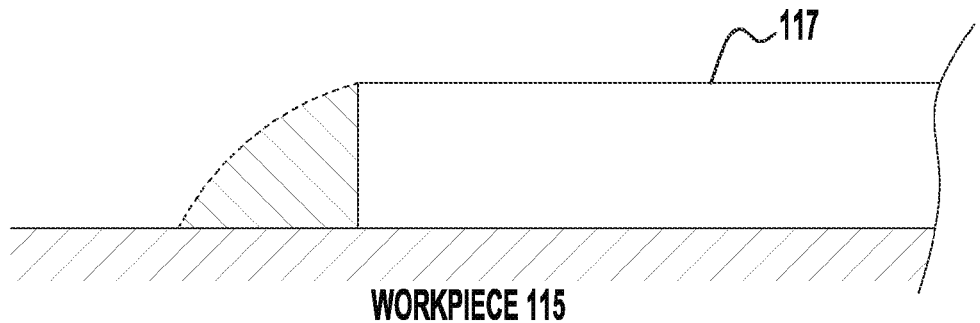
FIG. 5A-5C illustrate exemplary cladding edge profiles.
Figure 5B:
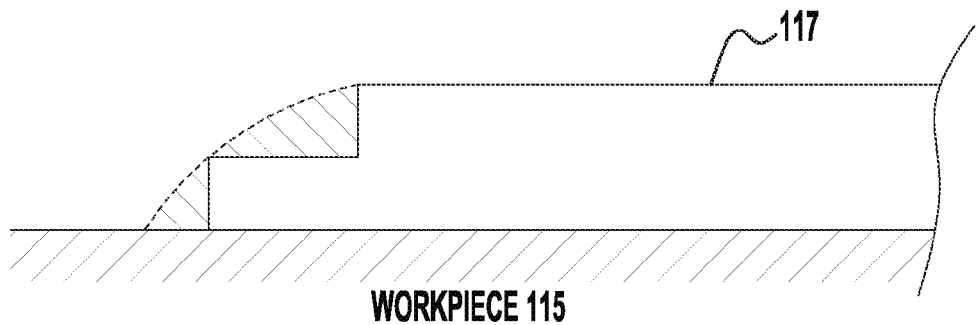
Figure 5C:
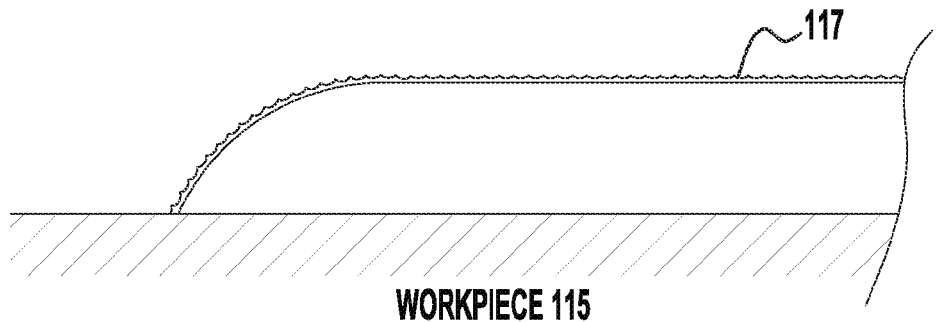

For example, as shown in FIG. 5A, the cladding layer 17 was deposited with its edges rounded (dotted line) and extending beyond a desired cladding layer profile (solid line). In this case, the shaded region needs to be removed. In an exemplary embodiment, the motors 225/325 (and/or optics) will position the lasers 220/320 over the shaded portion and beams 210/310 will scan over the shaded portions to remove the undesired material. Of course, other edge profiles are possible using the present invention. For example, in FIG. 5B, the cladding edge has a stepped profile. In this case, the intensity of laser beams 210/310, frequency of the laser pulses the speed of motors 225/325, etc, can be varied as needed in order to produce each step of the profile. The above operational examples relate to changing the cladding profile by removing cladding material. However, the present invention can also be used to provide "finishing" touches in which a thin layer is melted and/or vaporized. For example, as shown in FIG. 5C, the edge and cladding surfaces are rough and irregular. The laser beams 210/310 of the present invention can be adjusted/pulsed as discussed above to melt and/or evaporate a thin layer of the surface to remove the roughness and leave a finished smooth surface. Thus, in exemplary embodiments the lasers can be used to provide a polishing or finishing step after the deposition of the cladding layer, and this can be done nearly immediately after the cladding process.

In some exemplary embodiments all that is needed is that a surface portion of the cladding layer 117 be made molten after the cladding operation to allow the surface—which may be rougher than desired—to flatten and become smoother. This can be accomplished by simply allowing gravity to provide the flattening or smoothing force, but can also be achieved by using mechanical devices, such as smooth blades, to smooth the surface and/or remove excess material to provide the desired surface roughness and/or shape. Furthermore, it may be desired that the cladding layer 117 not have a smooth surface but rather a grooved or gouged surface with a series of troughs and peaks. In such embodiments, the laser(s) can be used to create the grooves in the cladding layer 117, and the laser(s) can be used to make a portion of the cladding layer molten so that a mechanical device can create the desired shape and/or grooves.

In exemplary embodiments of the present invention, the laser 220/320 can be selectively operated based on the cladding operation. For example, when rows of cladding material are deposited adjacent to one another to form the cladding layer on the workpiece, the edging lasers may be selectively operated as the cladding row edge adjacent to a previously deposited row may not need edging.

Figure 6:
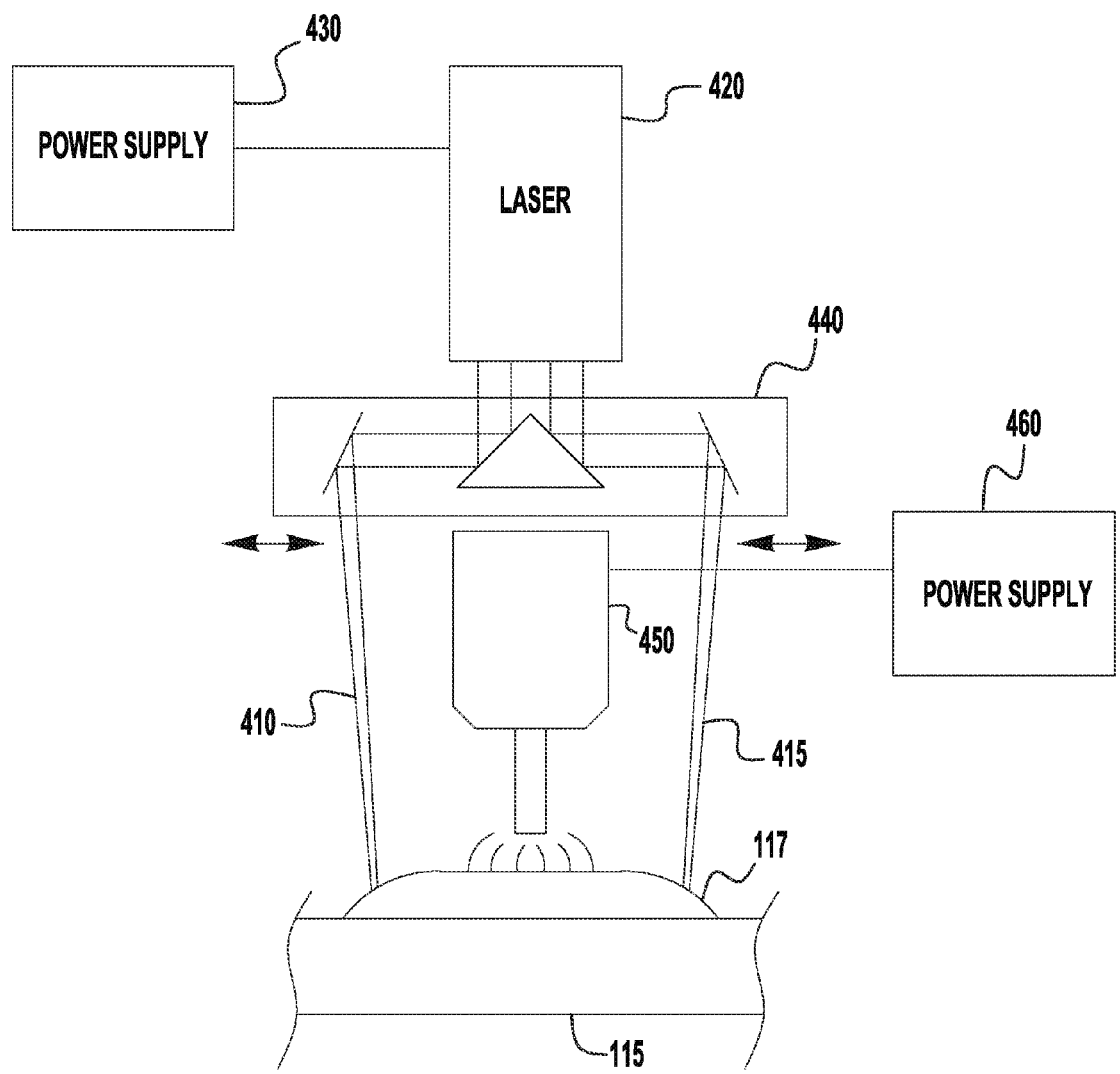
FIG. 6 illustrates a functional schematic block diagram of an exemplary embodiment of an energy source and edging system for any of cladding, building up, and hard-facing overlaying applications.

The embodiments discussed above generally use two lasers, one for each edge. However, the present invention can use one laser and simultaneously modify both edges as illustrated in FIG. 6. For brevity, only the pertinent differences will be discussed. As shown in FIG. 6, laser 420 and optics 440 are used to provide laser beams 410 and 415, which respectively impinge on the cladding layer edges. The optics 440 can be adjusted such that the laser beams 410/415 can be moved in the width direction of the cladding layer as indicated by the arrows. In the exemplary embodiment of FIG. 6, an arc-type device 450 is used as the heat source for creating melt puddle 145 (not shown) and, if needed, for melting wire 140 (not shown) instead of a laser.

In the above embodiments, the various power supplies and control units are shown separately for clarity. However, in embodiments of the invention these components can be made integral into a single welding system. Aspects of the present invention do not require the individually discussed components above to be maintained as separately physical units or stand alone structures.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A system for edging a deposit layer in any of cladding, building up, and hard-facing applications, said system comprising:
   a high intensity heat source that heats a workpiece and creates a molten puddle;
   a wire feeder that feeds a wire to said molten puddle, said wire melts in said molten puddle and creates a bond with said molten puddle to form said deposit layer on said workpiece; and
   an edging system comprising at least one laser that emits a laser beam that impinges on at least one of a surface area and an edge area of said deposit layer to modify said deposit layer by at least one of melting and vaporizing at least a portion of said at least one of said surface area and said edge area.

2. The system of claim 1, further comprising:
   a power supply that supplies a heating current through a length of said wire to heat said length of said wire to at or near a melting temperature of said wire.

3. The system of claim 1, wherein said edging system comprises a positioning system to position an impingement point of each said laser beam of said at least one laser in a width direction of said deposit layer.

4. The system of claim 3, wherein said positioning system comprises at least one of an optical system and an electro-mechanical system to perform said positioning of said impingement point.

5. The system of claim 3, wherein said impingement point of each said laser beam can be positioned cover 50% to 100% of said deposit layer in said width direction.

6. The system of claim 3, wherein, for each of said at least one laser, at least one of a focal point, an intensity, a frequency of laser pulses, and a speed of said positioning is adjustable to control an amount of said deposit layer that is melted or vaporized.

7. The system of claim 1, wherein said forming of said deposit layer and said modification of said deposit layer are performed in a single pass by said system.

8. The system of claim 1, wherein said forming of said deposit layer and said modification of said deposit layer are performed in separate passes by said system.

9. The system of claim 1, wherein said high intensity heat source is a laser.

10. The system of claim 1, wherein said high intensity heat source is an arc-type heat source.

11. A method for edging a deposit layer in any of cladding, building up, and hard-facing applications, said method comprising:
heating a workpiece to create a molten puddle;
feeding a wire to said molten puddle, said wire melting in said molten puddle and creating a bond with said molten puddle to form said deposit layer on said workpiece; and
impinging at least one laser beam on at least one of a surface area and an edge area of said deposit layer to modify said deposit layer by at least one of melting and vaporizing at least a portion of said at least one of said surface area and said edge area.

12. The method of claim 11, further comprising:
supplying a heating current through a length of said wire to heat said length of said wire to at or near a melting temperature of said wire.

13. The method of claim 11, further comprising:
positioning an impingement point of each said at least one laser beam in a width direction of said deposit layer.

14. The method of claim 13, wherein said positioning of said impingement point comprises using at least one of an optical system and an electro-mechanical system.

15. The method of claim 13, wherein said impingement point of each said laser beam can be positioned to cover 50% to 100% of said deposit layer in id width direction.

16. The method of claim 13, further comprising:
adjusting, for each of said at least one laser beam, at least one of a focal point, an intensity, a frequency of pulses, and a speed of said positioning to control an amount of said deposit layer that is melted or vaporized.

17. The method of claim 11, wherein said forming of said deposit layer and said modification of said deposit layer are performed in a single pass.

18. The method of claim 11, wherein said forming of said deposit layer and said modification of said deposit layer are performed in separate passes.

19. The method of claim 11, wherein said heating to create said molten comprises using a laser.

20. The method of claim 11, wherein said heating to create said molten comprises using an arc-type heat source.

* * * * *